(12) United States Patent
Kenny et al.

(10) Patent No.: US 8,149,504 B2
(45) Date of Patent: Apr. 3, 2012

(54) OPTICAL INDICATOR FOR MICROSCOPIC LASER BEAM MANIPULATION

(75) Inventors: Thomas G. Kenny, Ipswich, MA (US); Diarmaid H. Douglas-Hamilton, Beverly, MA (US)

(73) Assignee: Hamilton Thorne Biosciences, Inc., Beverly, MA (US)

( * ) Notice: Subject to any disclaimer, the term of this patent is extended or adjusted under 35 U.S.C. 154(b) by 330 days.

(21) Appl. No.: 12/481,363

(22) Filed: Jun. 9, 2009

(65) Prior Publication Data

US 2009/0316259 A1 Dec. 24, 2009

Related U.S. Application Data

(60) Provisional application No. 61/060,354, filed on Jun. 10, 2008.

(51) Int. Cl.
*G02B 21/06* (2006.01)

(52) U.S. Cl. ........................................ 359/389; 607/89

(58) Field of Classification Search .................. 359/385, 359/388, 389, 368; 607/89
See application file for complete search history.

(56) References Cited

U.S. PATENT DOCUMENTS

| | | | |
|---|---|---|---|
| 2,471,879 A | 5/1949 | Lowber et al. | |
| 3,796,220 A * | 3/1974 | Bredemeier | 606/18 |
| 4,515,439 A | 5/1985 | Esswein | |
| 4,617,467 A | 10/1986 | Senftle et al. | |
| 4,884,880 A | 12/1989 | Lichtman et al. | |
| 4,904,085 A | 2/1990 | Spillman Jr. et al. | |
| 5,349,468 A | 9/1994 | Rathbone et al. | |
| 5,610,712 A | 3/1997 | Schmitz et al. | |
| 5,754,289 A | 5/1998 | Ozaki et al. | |
| 5,759,781 A | 6/1998 | Ward et al. | |
| 5,936,728 A | 8/1999 | Bouzid | |
| 5,972,667 A | 10/1999 | Conia et al. | |
| 6,052,223 A | 4/2000 | Yoneyama et al. | |
| 6,251,615 B1 | 6/2001 | Oberhardt | |

(Continued)

FOREIGN PATENT DOCUMENTS

DE 3641341 6/1988

(Continued)

OTHER PUBLICATIONS

International Search Report dated Aug. 5, 2009 from PCT Application No. PCT/US2009/046847.

(Continued)

*Primary Examiner* — Alessandro Amari
(74) *Attorney, Agent, or Firm* — Stroock & Stroock & Lavan LLP

(57) ABSTRACT

An objective assembly for use with a microscope is provided. The objective has an optical axis that permits an image beam to be emitted through the objective toward the eyepiece of a microscope. A mirror is positioned at an angle to the optical axis of the objective. A laser assembly is positioned on a first side of the mirror for directing a laser beam toward said mirror so that the energy is reflected off the mirror and through the objective in a direction that is substantially aligned with the optical axis of the objective. An indicator assembly including a source of light is positioned with the light incident on the other side of the mirror to reflect a beam of light in a direction opposite to the direction of the laser beam to provide an optical representation at the eyepiece of a microscope of the position of the laser beam being emitted by the objective.

20 Claims, 14 Drawing Sheets

U.S. PATENT DOCUMENTS

| | | | |
|---|---|---|---|
| 6,313,944 | B2 | 11/2001 | Kawahito |
| 7,072,377 | B2 | 7/2006 | Douglas-Hamilton |
| 7,359,116 | B2 | 4/2008 | Kenny |
| 2003/0090792 | A1* | 5/2003 | Kenny et al. .................. 359/385 |
| 2005/0068614 | A1 | 3/2005 | Yoneyama et al. |
| 2007/0291798 | A1 | 12/2007 | Kenny et al. |
| 2010/0118395 | A1* | 5/2010 | Douglas-Hamilton et al. .......................... 359/385 |

FOREIGN PATENT DOCUMENTS

| | | |
|---|---|---|
| JP | 57208524 | 12/1982 |
| JP | 2008197127 | 8/2008 |
| WO | WO98/14816 | 4/1998 |
| WO | WO03/034124 | 4/2003 |

OTHER PUBLICATIONS

Berns, M.W. et al. "Laser scissors and tweezers." Methods Cell Biol. 1998;55:71-98.

Cohen, J. et al. "Implantation enhancement by selective assisted hatching using zona drilling of human embryos with poor prognosis." Hum. Reprod. May 1992;7(5):685-91.

Douglas-Hamilton, D.H. et al. "Thermal effects in laser-assisted pre-embryo:zona drilling." J. Biomed. Optics Apr. 2001;6(2):205-213.

Germond, M. et al. "Microdissection of mouse and human zona pellucida using a 1.48 IJm diod laser beam: efficiency and safety of the procedure." Fertility and Sterility Sep. 1995;64(3):604-611.

Montag, M. et al. "Laser-assisted microdissection of the zona pellucida facilitates polar body biopsy." Fertility and Sterility Mar. 1998;69(3):539-542.

Petit, C. et al. "Use of PRINS for preconception screening of polar bodies for common aneuploidies." Prenatal Diagnosis 2000;20:1067-1071.

Strom, C.M. et a/. "Neonatal outcome of preimplantation genetic diagnosis by polar body removal: the first 109 infants." Pediatrics Oct. 2000; 106(4):650-3.

Veiga, A. et a/. "Laser blastocyst biopsy for preimplantation diagnosis in the human." Zygote Nov. 1997;5(4):351-4.

Viville, S. eta/. "Human embryo research in France." Hum. Reprod. Feb. 2002;17(2):261-3.

Cell Robotics International, Inc. "CRI Workstation. LaserScissors Workstation" pp. 1-2, retrieved from Internet on Oct. 9, 2001 http:www.cellrobotics.com/workstationllsws.html.

Cell Robotics International, Inc. "CRI Workstation. LaserTweezers Workstation" p. 1, retrieved from Internet on Oct. 9, 2001 http:www.cellrobotics.comlworkstationlltws.html.

\* cited by examiner

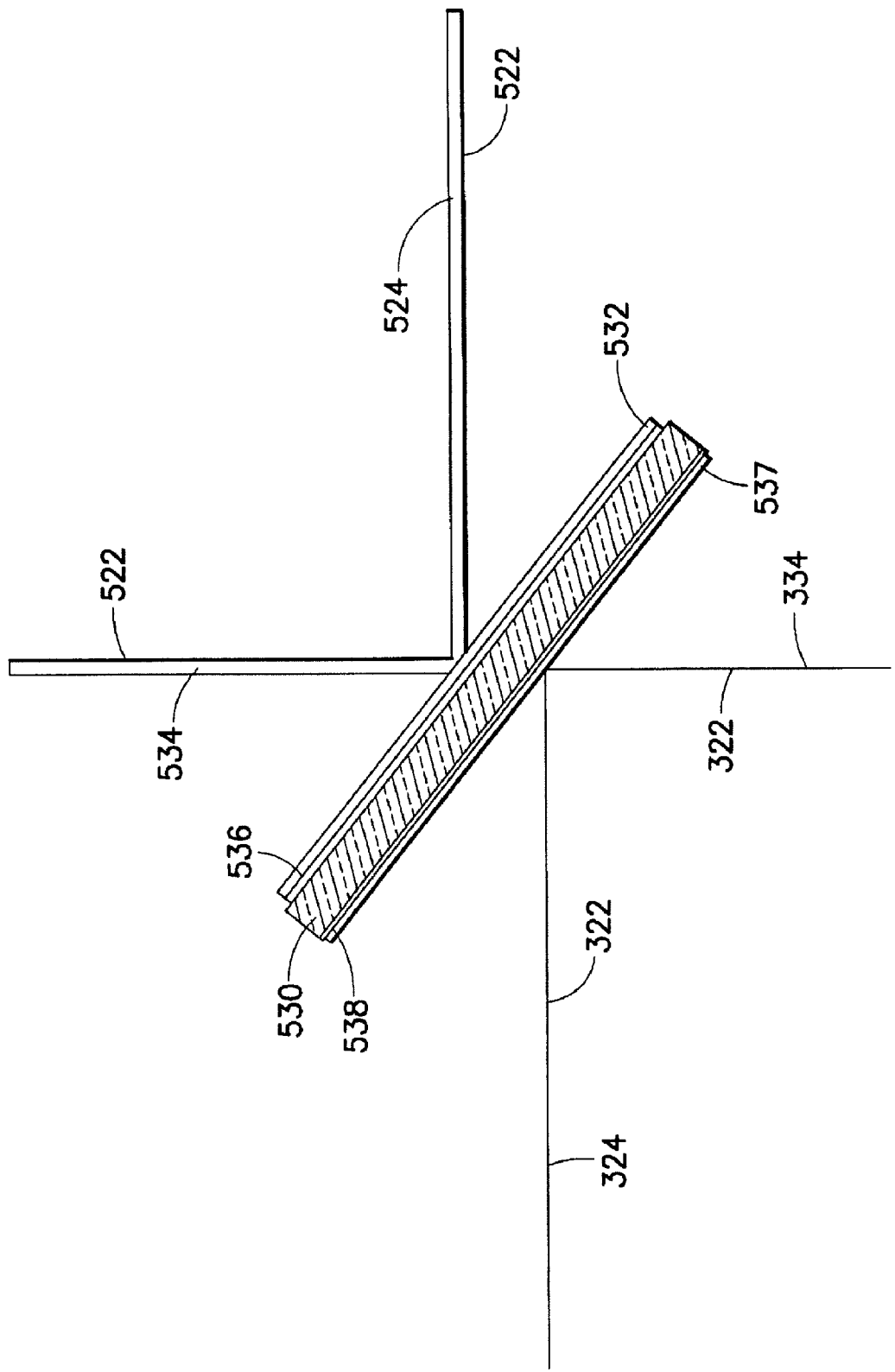

Section B-B

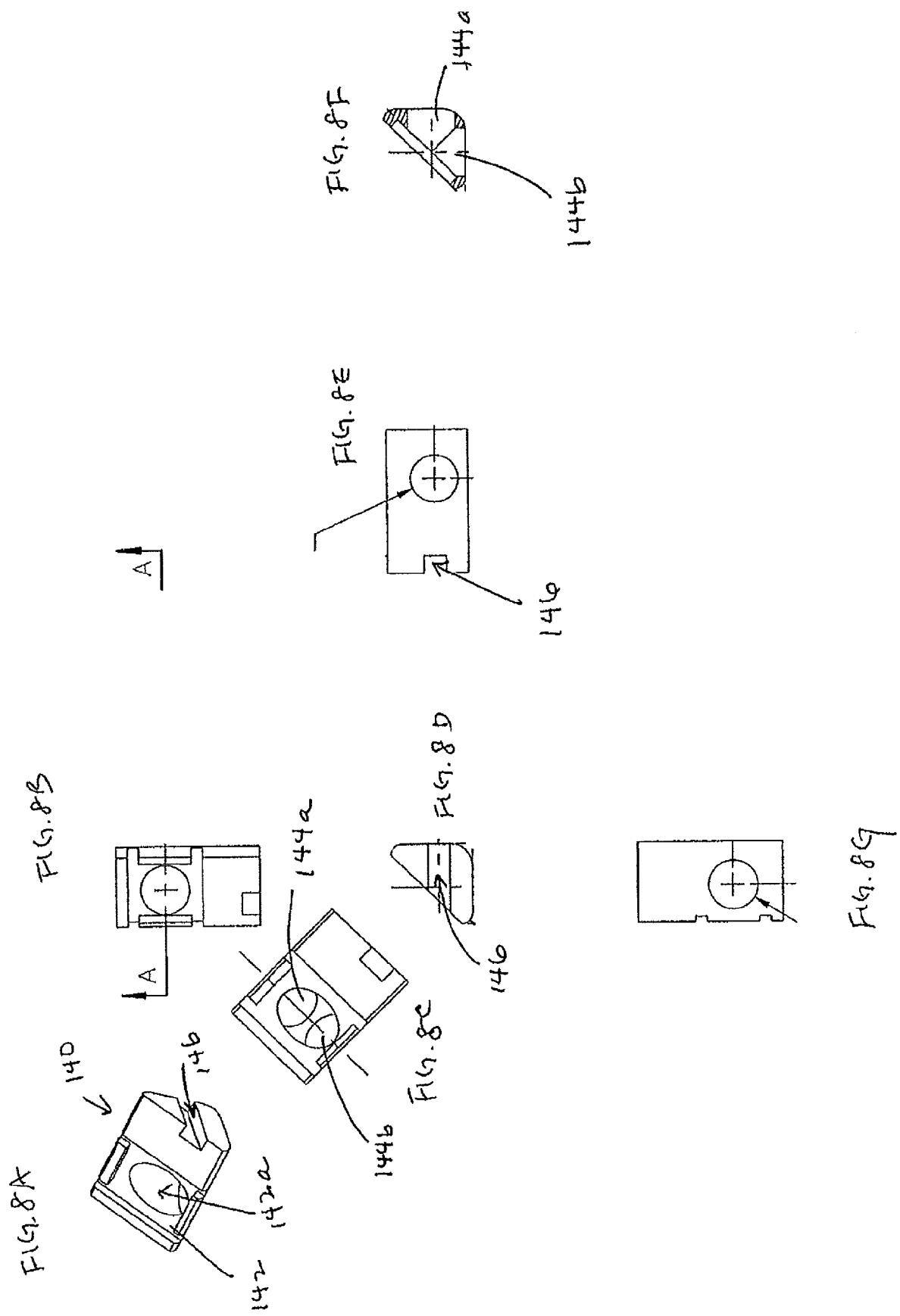

US 8,149,504 B2

OPTICAL INDICATOR FOR MICROSCOPIC LASER BEAM MANIPULATION

CROSS-REFERENCE TO RELATED APPLICATION

This application claims priority under 35 U.S.C. §119(e) to Provisional Patent Application No. 61/060,354, filed Jun. 10, 2008, the entire disclosure of which is incorporated herein by reference.

BACKGROUND OF INVENTION

1. Field of Invention

This invention relates generally to providing an optical indication in the eyepiece of a microscope that is representative of the location at which a specimen is manipulated (e.g. by a laser beam during microsurgery), and, in particular, to an objective assembly for use with a microscope that provides an optical indication in the eyepiece of a microscope when a specimen is micro-manipulated during laser beam surgery.

2. Description of Related Arts

Recent advances in biology and medicine have led to the development of laser beam microsurgery on cells. The laser beam is well adapted to micro-manipulation of small objects, such as single cells or organelles. It provides the advantage of non-contact ablation, volatilization, sterilization and denaturing, cutting, and other forms of thermal and actinic-light treatment. The four parameters of focal spot size, laser wavelength, pulse duration, and laser power, provide a variety of regimes suitable for different applications. One example of a use of laser beam microsurgery is the application of laser beams to the treatment of a mammalian oocyte and embryo. However, laser beam microsurgery or manipulation in a number of inverted or upright microscopes can be utilized for many different surgical, medical or research applications.

In accordance with commonly practiced methods of laser beam microsurgery, the person conducting the microsurgery watches a screen displaying the sample and an indication of where the laser beam would be applied on the sample. One indication of the position of the laser beam on the sample is the formation sometimes of a plurality of isothermal contours on the specimen that evidence the range of effect the heat from the laser beam may have. Examples of such isothermal contours are described in U.S. Pat. No. 7,359,116 and U.S. patent application Ser. No. 11/764,064, which are incorporated by reference as if fully set forth herein. Accordingly, providing an optical indication in the eyepiece of a microscope of the position at which the specimen is manipulated would be highly desirable.

SUMMARY OF THE INVENTION

This invention relates, in general, to an indicator assembly in the objective of a microscope and the use thereof. Whereas systems and methods using a screen for indicating the position of the laser are effective, the invention improves upon such systems and methods by providing a visible indication that is representative of the position of the laser via the eyepiece of the microscope.

According to an embodiment of the invention, an objective assembly for use with a microscope is provided. The objective has an optical axis that permits an image beam to be emitted through the objective toward the eyepiece of a microscope. A mirror is positioned at an angle to the optical axis of the objective. A laser assembly is positioned on a first side of the mirror for directing a laser beam toward said mirror so that the energy is reflected off the mirror and through the objective in a direction that is substantially aligned with the optical axis of the objective. This laser beam may be of a wavelength invisible to the human eye. An indicator assembly including a source of light is positioned with the light incident on the other side of the mirror to reflect a beam of light in a direction opposite to the direction of the laser beam to provide an optical representation at the eyepiece of a microscope of the position of the laser beam being emitted by the objective. The person conducting the microsurgery can thus obtain an indication of the position of the laser manipulation through the eyepiece while conducting microsurgery.

Accordingly, it is an object to provide an indicator assembly for providing a beam visible through the eyepiece of a microscope that is representative of the position of the laser on a specimen.

It is also an object to provide an objective assembly mountable onto a turret of a microscope.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE FIGURES

For a fuller understanding of the invention, reference is had to the following description, taken in connection with the accompanying drawings, in which:

FIG. 5A is a schematic view of a first embodiment of a mirror assembly in accordance with the instant invention;

FIGS. 8A-8G illustrate a mirror mount in accordance with an embodiment of the invention;

DETAILED DESCRIPTION

An illustrative embodiment of the present invention relates to a system for providing an optical indication that is visible through the eyepiece of a microscope, the visible beam preferably representing the precise position of a laser beam. The invention also relates to an objective assembly having an objective, an indicator assembly and a laser assembly that can be used with a microscope or other device with which laser manipulation is conducted. The invention is also directed toward the method of conducting laser microscopy using an indicator beam representing the position of the laser through the eyepiece of the microscope.

Figure 1:
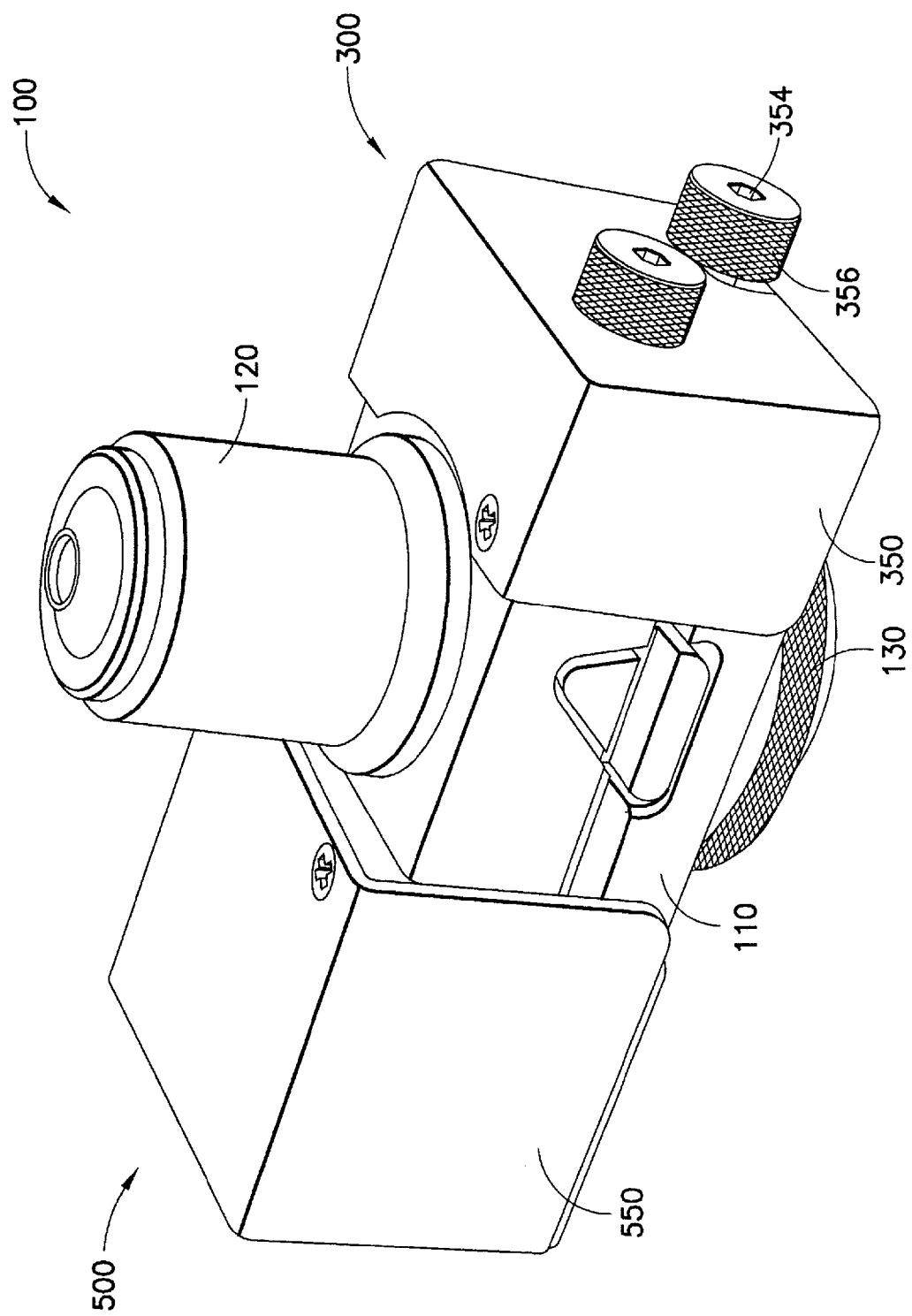
FIG. 1 is a perspective view of an objective assembly in accordance with an exemplary embodiment of the invention.

Reference is made to FIGS. 1-4B, wherein an exemplary embodiment of an objective assembly 100 is shown as having a housing 110 onto which an objective 120 and a turret adapter 130 are mounted. As depicted in FIG. 1 1 objective assembly 100 is preferably mountable onto a turret 50 of a microscope via turret adapter 130. For example, turret adapter 130 can include a threaded portion corresponding to a threaded portion of the turret of the microscope such that objective assembly 100 can be screwed onto the turret. Alternatively, turret adapter 130 can be slid or snapped into place, or include an external locking mechanism to mount objective assembly 100 onto the turret and preferably maintain objective assembly 100 in place on the turret of the microscope.

Figures 4A, 4B:
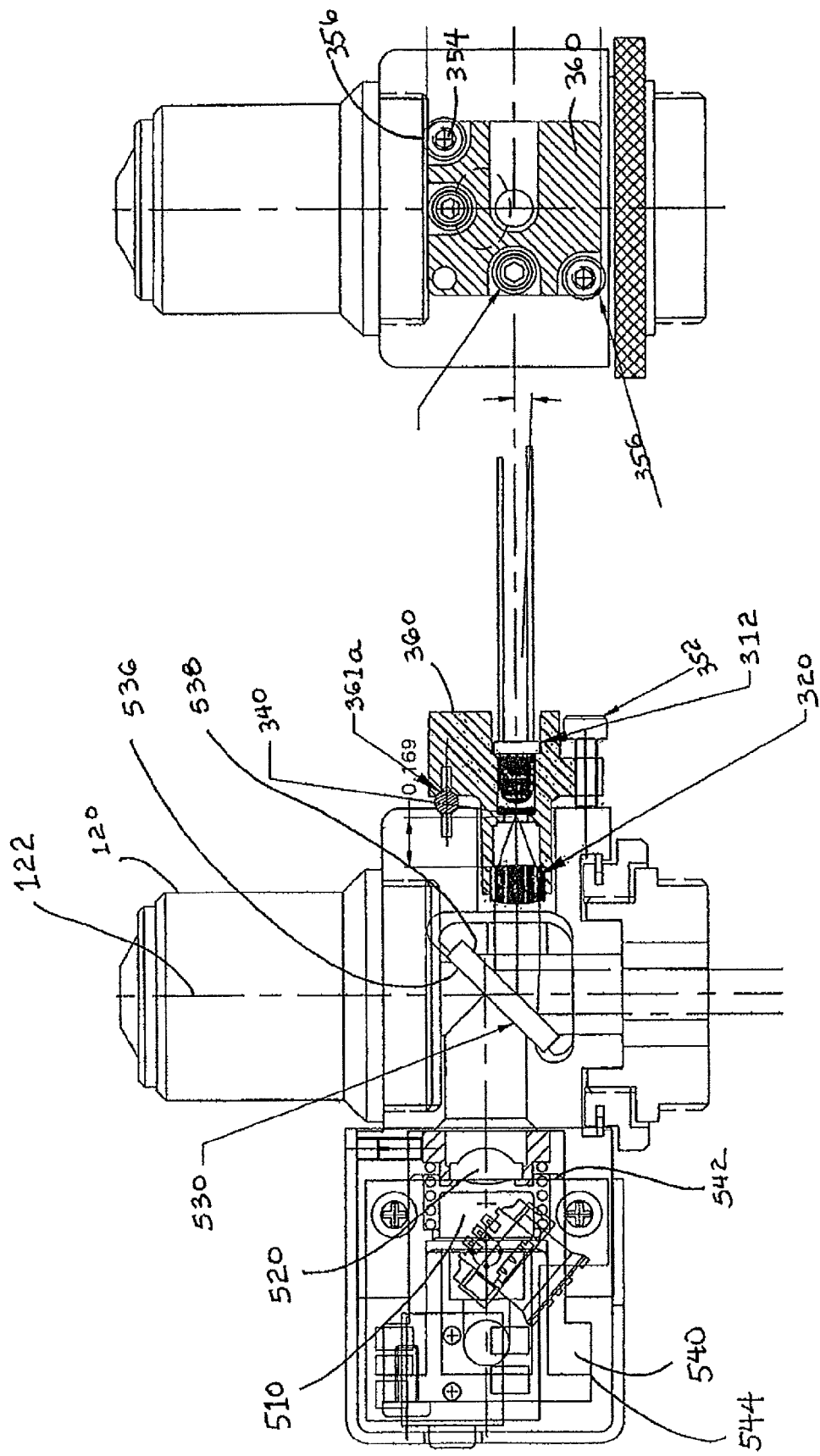
FIGS. 4A and 4B are schematic views of an objective assembly in accordance with an exemplary embodiment of the invention.
Figure 11:
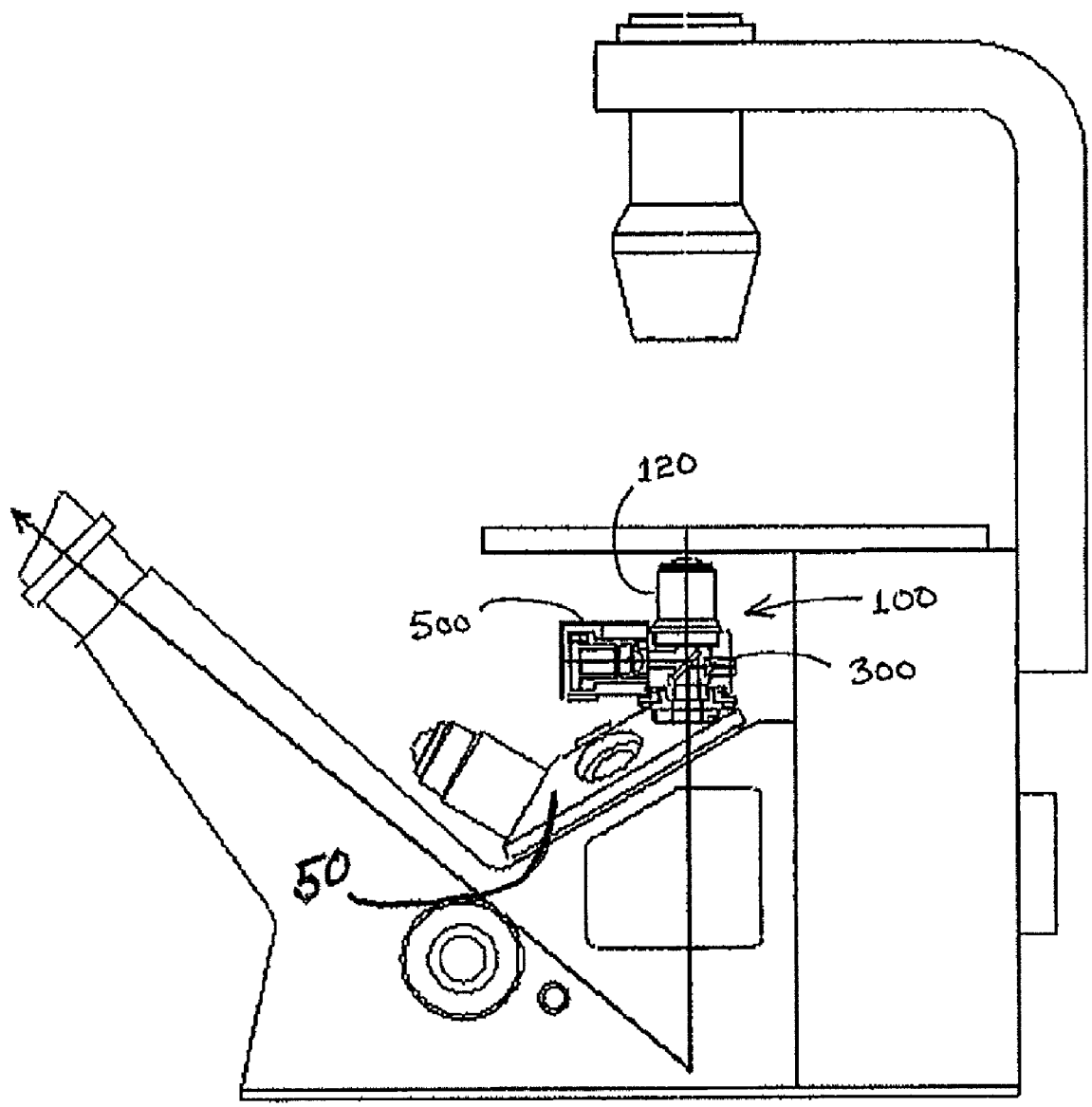
FIG. 11 is a schematic view of a microscope having an objective assembly of the type contemplated by the instant invention.

As depicted in FIG. 4A objective 120 preferably has an optical path 122, otherwise referred to as an optical axis. Preferably, the microscope emits an image beam through the stage of a microscope, objective 120, and into the eyepiece such that the sample on the stage can be seen via the eyepiece. The image beam preferably focuses via the tube lens and eyepiece (See FIG. 11), at the eye of the viewer and can be adjusted in intensity to adapt to the viewer. The image beam is preferably coaxial with optical path 122 when objective assembly 100 is mounted onto the turret of the microscope. Accordingly, the sample on the stage of the microscope, for example, where the sample is being studied, manipulated, etc. along the optical path 122 of objective 120 can be seen through the eyepiece.

In accordance with the embodiment shown, objective assembly 100 also includes a laser assembly 500. Such a laser assembly is shown and described in U.S. Pat. No. 7,359,116 and U.S. patent application Ser. No. 11/764,064, both of which have been assigned to Hamilton Thorne Biosciences, Inc. and are incorporated in their entirety by reference herein. For example, laser assembly 500 preferably includes a laser source 510 such as a laser diode, a collimating lens 520 and a mirror 530. Laser source 510 preferably emits an elliptical cone of laser light, toward collimating lens 520, more preferably diverging from laser source 510 toward collimating lens 520. It is to be understood that the laser light emitted by laser source 510 toward collimating lens 520 can converge or be collimated without deviating from the scope of the invention. It is to be further understood that the degree of collimation of laser light emitted from collimating lens 520 may be adjusted by varying the distance between laser 510 and collimating lens 520, and that this adjustment allows the laser beam emerging from objective 120 to be made exactly confocal with the light (generally, visible) used to create an image of the object at the eyepiece focal plane. The laser light is preferably transmitted toward and through collimating lens 520, after which time the laser light is collimated. Therefore, the laser light can exit collimating lens 520 as a collimated laser beam 522. As used herein the terms "collimating laser beam" and "indicator collimating beam" are intended to mean that the laser beam and/or light beam may be slightly converging or diverging as to make it con-focal with the visible image beam.

Referring to FIG. 5A, in a first embodiment collimated laser beam 522 can be emitted toward a dichroic mirror 530. In accordance with an exemplary embodiment of mirror 530, a coating 532 such as an infrared reflector can be provided on mirror 530 facing laser source 510. Preferably, coating 532 enhances the reflectivity of an infrared collimated laser beam 522 off mirror 530 toward objective 120.

FIG. 5A illustrates the path of collimated laser beam 522 from collimating lens 520 to objective 120. Collimated laser beam 522 exits collimating lens 520 and travels along a first laser path 524 toward mirror 540. Once collimated laser beam 522 contacts the front surface 532 of mirror 530, collimated laser beam 522 reflects off mirror 530 and travels along a second laser path 534 toward objective 120. The second laser path 534 is preferably in substantial coaxial alignment with the optical axis 122 of objective 120, thus traveling toward objective 120 and further toward the stage of the microscope. However, it is understood by one skilled in the art that such coaxial alignment may not be precise and hence the term "substantial alignment" has been used to explain that the collimated laser beam is parallel to and close to if not in perfect coaxial alignment with the optical axis of the objective. Accordingly, collimated laser beam 522 is also substantially aligned with the image beam of the microscope but travels in the opposite direction, toward the object and thus away from eyepiece. Since the laser beam may be in the infra-red wavelength region as well as traveling away from the eyepiece, it is likely not to be visible in the eyepiece of a microscope. The position of the collimated laser beam 522 and preferably the computer target overlay (e.g. isothermal rings) on the specimen can be displayed on a screen, which a person may watch while conducting the microscopy.

Figure 3:
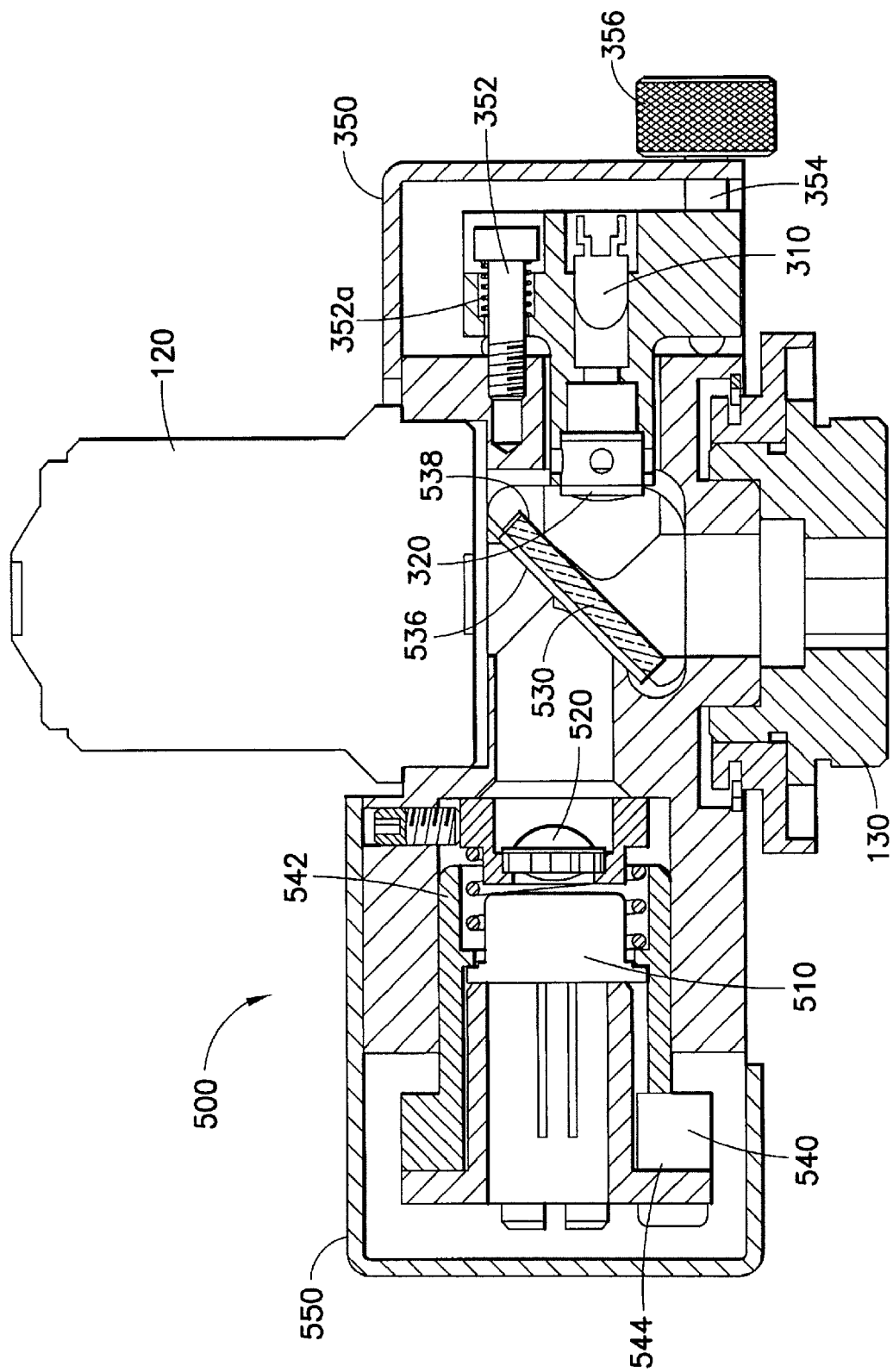
FIG. 3 is a sectional view of the objective assembly of FIG. 1.

Referring to FIGS. 3-4A, in accordance with the instant invention an indicator assembly 300 is provided, preferably on the opposite side of mirror 530 from laser assembly 500. As shown, indicator assembly can include an indicator light source 310 such as an LED (light emitting diode), which emits light toward mirror 530. Preferably, the light is emitted toward an indicator collimating lens 320 which collimates the light such that a collimated beam of light, referred to herein as indicator collimated beam 322, exits indicator collimating lens 320 toward mirror 530. Indicator collimated beam 322 can then reflect off mirror 530 away from objective 120 and thus toward the eyepiece of the microscope. Preferably, indicator light source 310 and indicator collimating lens 320 are mounted on an indicator mount 360 which is preferably connected to housing 110.

Referring to FIG. 5A, indicator collimated beam 322 preferably travels toward mirror 530 along a first indicator path 324 from indicator collimating lens 320. After reflecting off the second side 538 of dichroic mirror 530, which may be coated with a red reflector coating 537, indicator beam 322 travels along a second indicator path 334. Preferably, second indicator path 334 is substantially coaxially aligned with but in the opposite direction to second laser path 534 and thus optical path or optical axis 122 of objective 120, More preferably, second indicator path 334 is coaxial to and is in substantial alignment with the image beam of the microscope and travels toward the eyepiece of the microscope.

Referring to FIG. 5A, laser beam 522 preferably reflects off a first side 536 of mirror 530 and indicator beam 322 preferably reflects off a second side 538 on the opposite side of mirror 530. Second side 538 can include a reflector coating or other reflection enhancing mechanism. Alternatively, second side 538 can be left uncoated or coated with an anti-reflector coating.

Whereas the embodiments shown in FIG. 5A illustrate a single mirror 530, a plurality of mirrors can be provided as a matter of application specific design choice. In accordance with an embodiment wherein more than one mirror are provided, the laser assembly and the indicator assembly can be on the same side of the optical path, be positioned perpendicularly, etc. without deviating from the scope of the invention. Additionally, whereas a 45° mirror may be preferred, it is to be understood that the angle of mirror 530 can be varied, as well as the position of the mirror along the optical path of the objective without deviating from the scope of the invention.

Figure 5B:
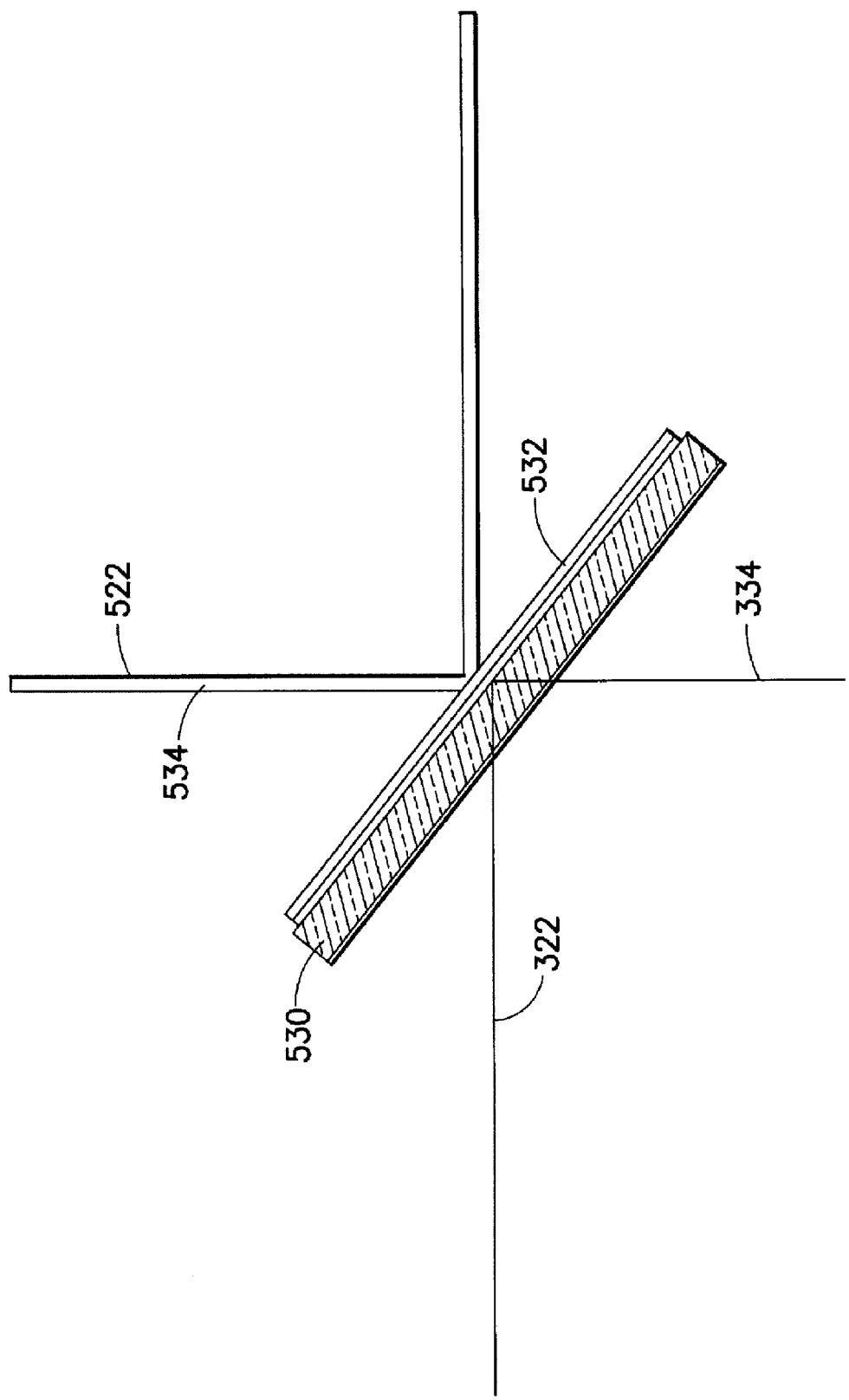
FIG. 5B is a schematic view of an alternative embodiment of a mirror assembly in accordance with the instant invention.
Figure 6A:
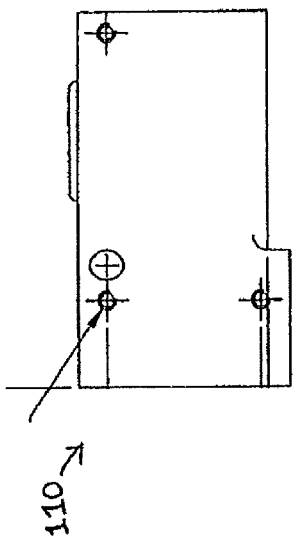
FIGS. 6A-6H illustrate an objective housing in accordance with an embodiment of the invention.
Figure 6B:
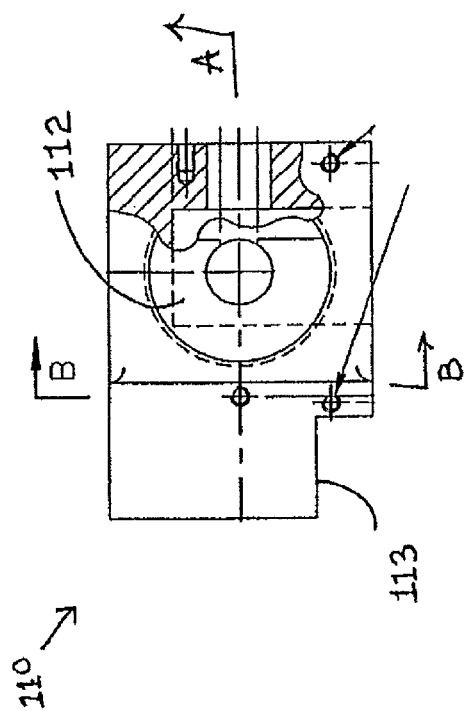
Figure 6C:
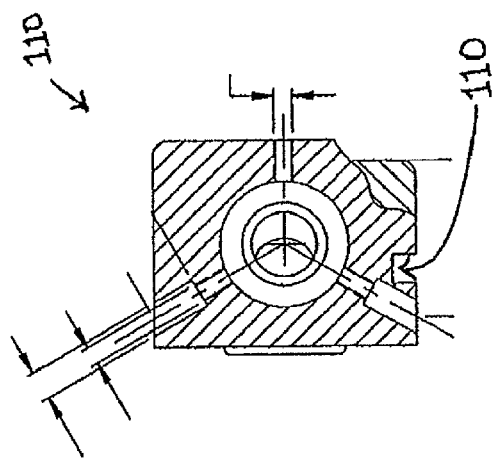
Figure 6D:
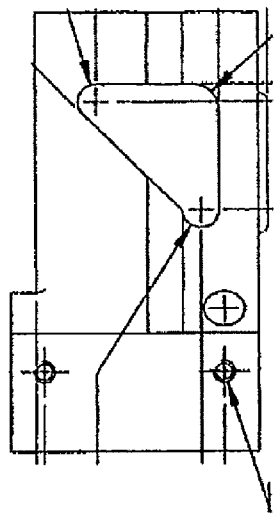
Figure 6F:
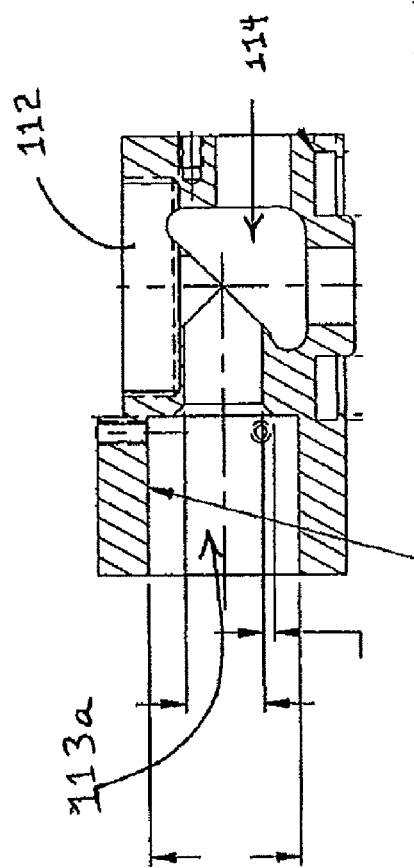
Figure 6E:
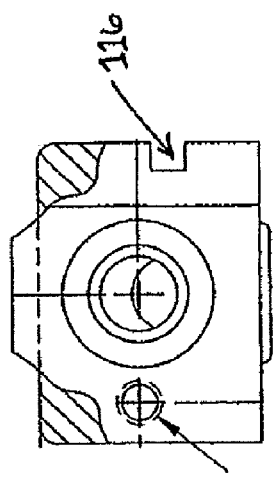
Figure 6H:
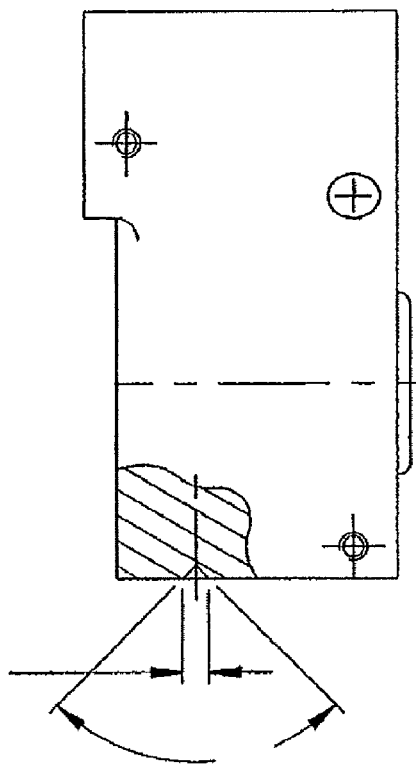
Figure 6G:
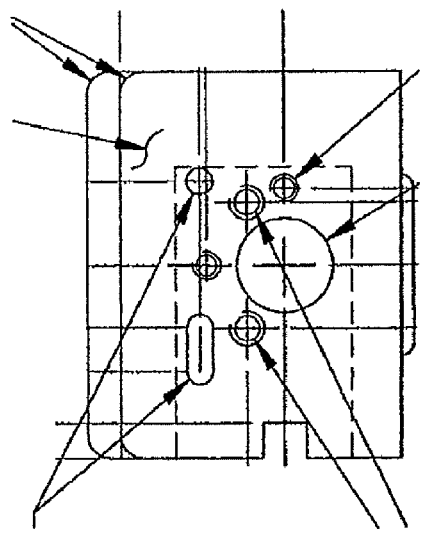

Reference is also made to FIG. 5B, wherein an alternative embodiment of the mirror configuration of the instant invention is depicted, In FIG. 5B, only the front face of the mirror is coated with an IR reflective coating 532. The back side of the mirror 530 permits that indicator beam to be transmitted through the mirror and reflected off the underside of the reflective layer, to create indicator beam 334, which is directed to the eyepiece. The reflective layer 532 may be constructed so that it preferentially reflects the ~45° incident laser beam 522 from the upper layer of 532, and the ~45° incident indicator beam 322 from the opposite side of layer 532. Again, the purpose of this mirror configuration is to create an indication beam that is substantially aligned with the optical axis of the objective but in the direction opposite to the direction of the laser beam energy.

Figure 10B:
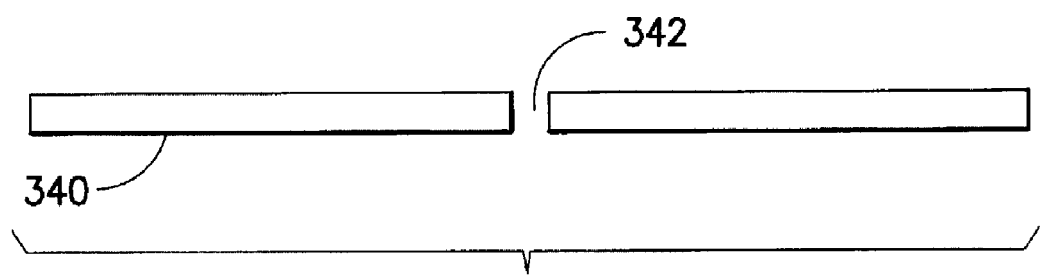
FIGS. 10A and 10B respectively are an elevated view and a side view of a disc with an aperture in accordance with an embodiment of the invention.

Preferably, the diameter of light emitted toward indicator collimating lens 320 is controlled, for example, reduced from the diameter of indicator light source 310. Referring to FIG. 10, a reducing element 340 can be provided between indicator light source 310 and indicator collimating lens 320, generally positioned at the focal point of collimating lens 320, to provide a small indicator light source. As shown, an embodiment of reducing element 340 can have a generally round shape, such as a substantially round and flat disk. However, it is to be understood that reducing element 340 can be elongated, cylindrical, or rectangular, hexagonal, etc. without deviating from the scope of the invention.

Figure 10A:
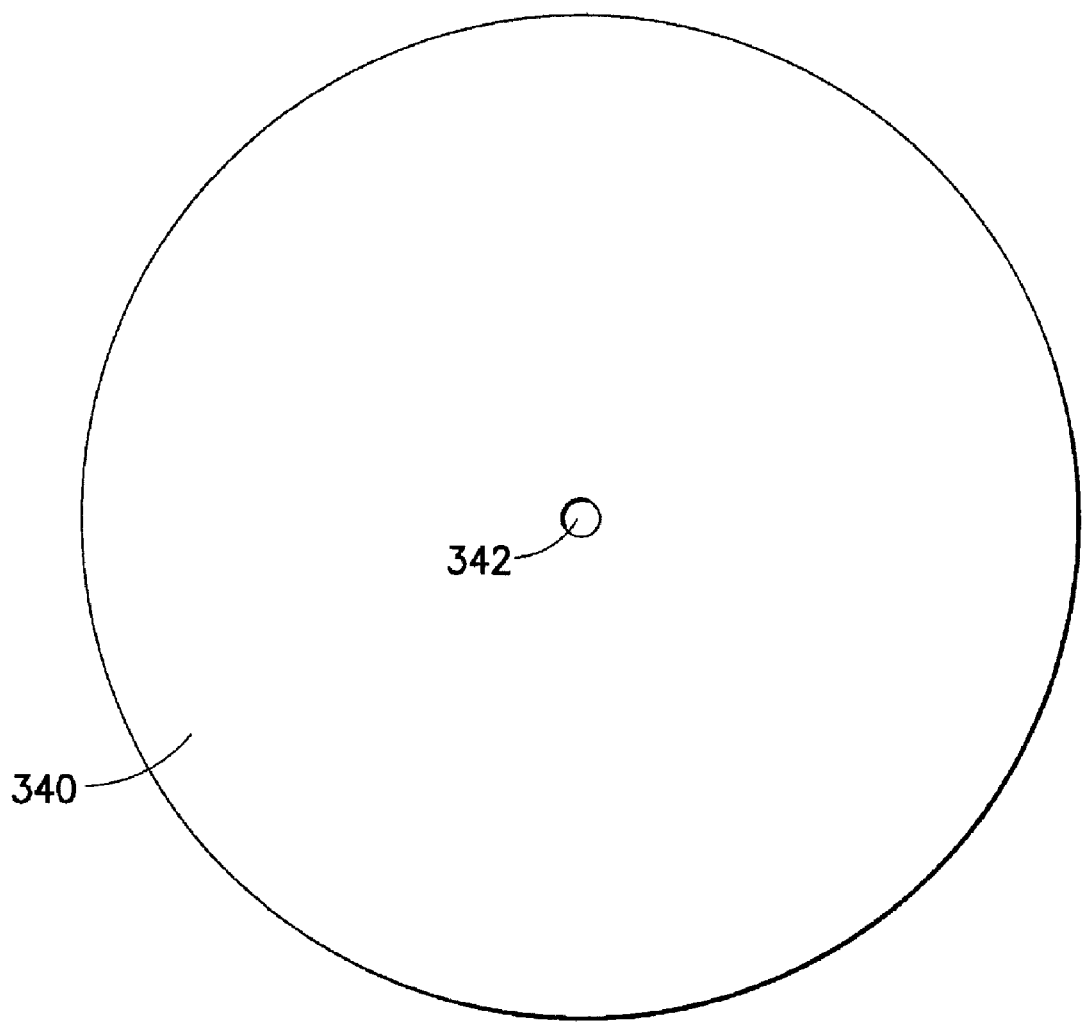

As shown in FIGS. 10A and 4A, reducing element 340 includes an aperture 342 through which indicator light can be emitted toward indicator collimating lens 320. Reducing element 340 will prevent the indicator light from passing through the remaining portion of reducing element 340. Therefore, the diameter of light emitted toward indicator collimating lens 320 can be controlled by controlling the size of aperture 342. In accordance with an exemplary embodiment, aperture 342 has a diameter of between about 5 to 10 µm, more preferably approximately 5 µm. Whereas aperture 342 is illustrated as having a generally round shape, it is to be understood that the shape of aperture 342 can be varied without deviating from the scope of the invention. Furthermore, without varying the scope of the invention, a light source having a small diameter can be used to emit the indicator light, in lieu of the reducing element 340.

Figure 7B:
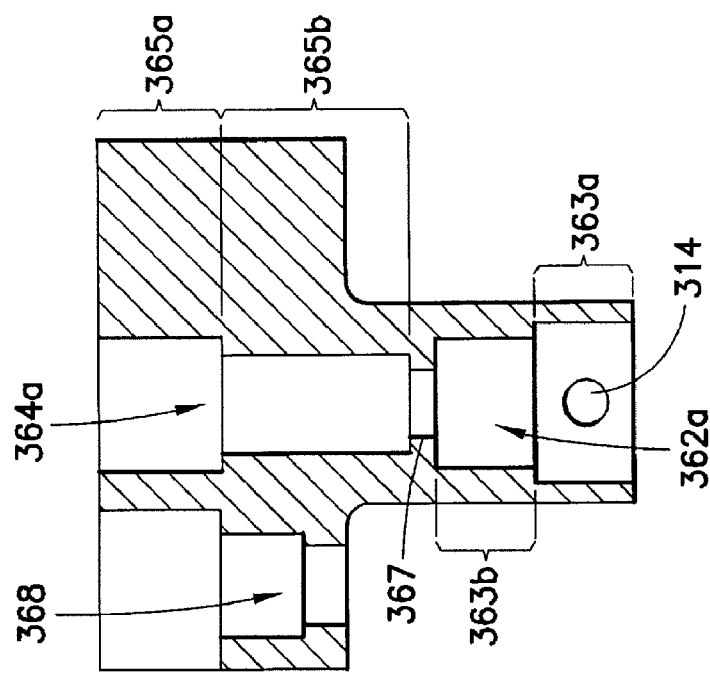
FIGS. 7A and 7B are sectional view of an indicator housing in accordance with an embodiment of the invention.
Figure 7A:
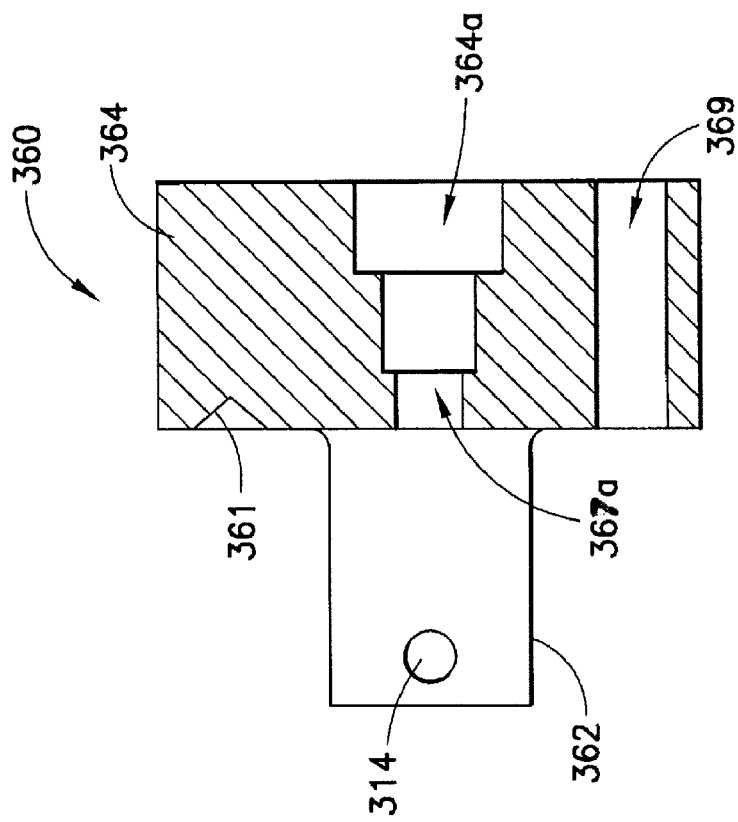
Figure 9C:
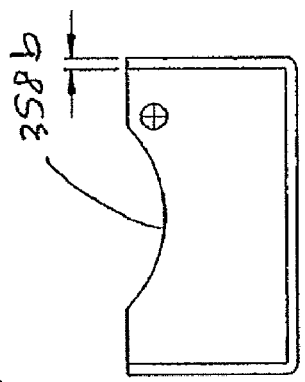
FIGS. 9A-9D illustrate an indicator cover in accordance with an embodiment of the invention.
Figure 9B:
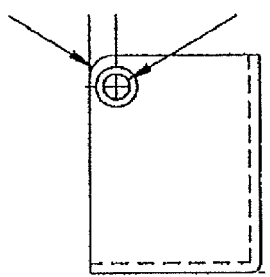
Figure 9A:
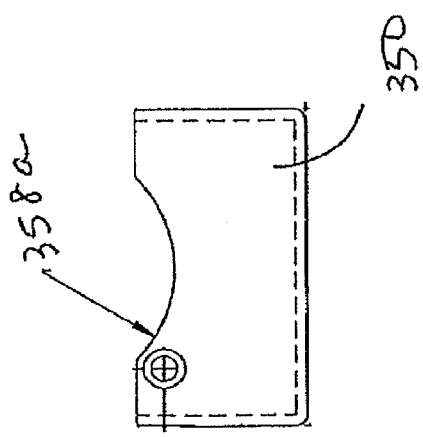
Figure 9D:
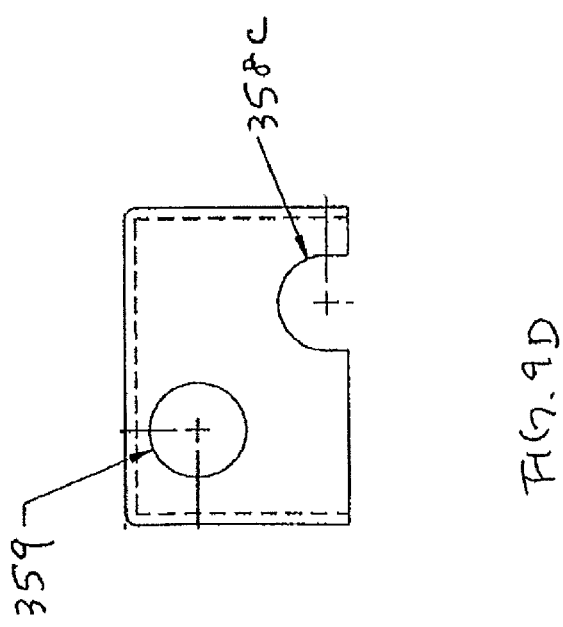

Reference is made to FIGS. 7A and 7B are cross-sectional view of an embodiment of indicator mount 360 which depicts an insertion portion 362 and an external portion 364. Insertion portion 362 is preferably constructed and arranged to be received within housing 110 and external portion 364 is preferably constructed and arranged to extend externally to housing 110 when attached to housing 110.

Insertion portion 362 preferably includes a first bore 362a having a first region 363a having a first inner diameter proximate the outer end of insertion portion 362, and a second region 363b having a second inner diameter adjacent to first region 363a. First region 363a is preferably sized and shaped to receive indicator beam collimating lens 320 therein. The second inner diameter can be narrower than the first inner diameter, and preferably prevents indicator collimating lens 320 from being inserted deeper within first bore 362a than desired. Therefore, indicator beam collimating lens 320 can be positioned at the focal distance from aperture 342, which can be referred to as a point source. Moreover, insertion portion 362 can include a plurality of apertures 314 within first region 363a, each aperture 314 shaped and sized to receive a rod or other stabilizing element to position indicator beam collimating lens 320 and to maintain indicator beam collimating lens 320 in place. In accordance with an exemplary embodiment, a rod can be inserted into each aperture 314 until indicator collimating lens 320 is positioned as desired, after which an adhesive can also be inserted into aperture 314 to fix the collimating lens 320 at the correct position within the first region 363a. Preferably, indicator collimating lens 320 is positioned and fixed at the focal distance from aperture 342 by the rods or other positioning and retaining mechanism. In the embodiment shown, insertion portion 362 includes four apertures 314 comprising two pairs of opposing apertures 314, which may facilitate positioning and stabilizing indicator collimating lens 320 by providing force followed by adhesive from four sides of indicator collimating lens 320.

External portion 364 preferably includes a second bore 364a having a first region 365a having a first inner diameter proximate the outer end of external portion 364, and a second region 365b having a second inner diameter adjacent to first region 365a. Second region 365b is preferably sized and shaped to receive indicator light source 310 therein. The second inner diameter can be narrower than the first inner diameter, and preferably prevents indicator light source 310 from being inserted deeper within second bore 364a than desired. For example, as shown in FIG. 4A, indicator light source 310 can include a light source flange 312 having a greater width than indicator light source 310. Light source flange 312 preferably has a greater diameter than the second inner diameter of second region 365b such that stopper 312 is prevented from entering second region 365b.

Referring to FIG. 7B, a middle portion 367 is provided between insertion portion 362 and external portion 364, preferably having an aperture 367a having a narrower diameter than both the second diameter of second region 363b of insertion portion 362 and the second diameter of second region 365b of external portion 364. Referring to FIG. 4A, an embodiment of reducing element 340 has a diameter less than or equal to the second diameter of second region 365b of external portion 364 but greater than the diameter of middle portion 367. Therefore, reducing element 340 can be received within second region 365b of external portion and about middle portion 367. Accordingly, the diameter of light from indicator light source 310 can be reduced according to the size of aperture 342 of reducing element 340 as the light is emitted from indicator light source 310 toward indicator collimating lens 320. Alternatively, reducing element 340 can be sized and shaped to be received within second region 363b of insertion portion 362 or within middle portion 367 without deviating from the scope of the invention.

Figure 2:
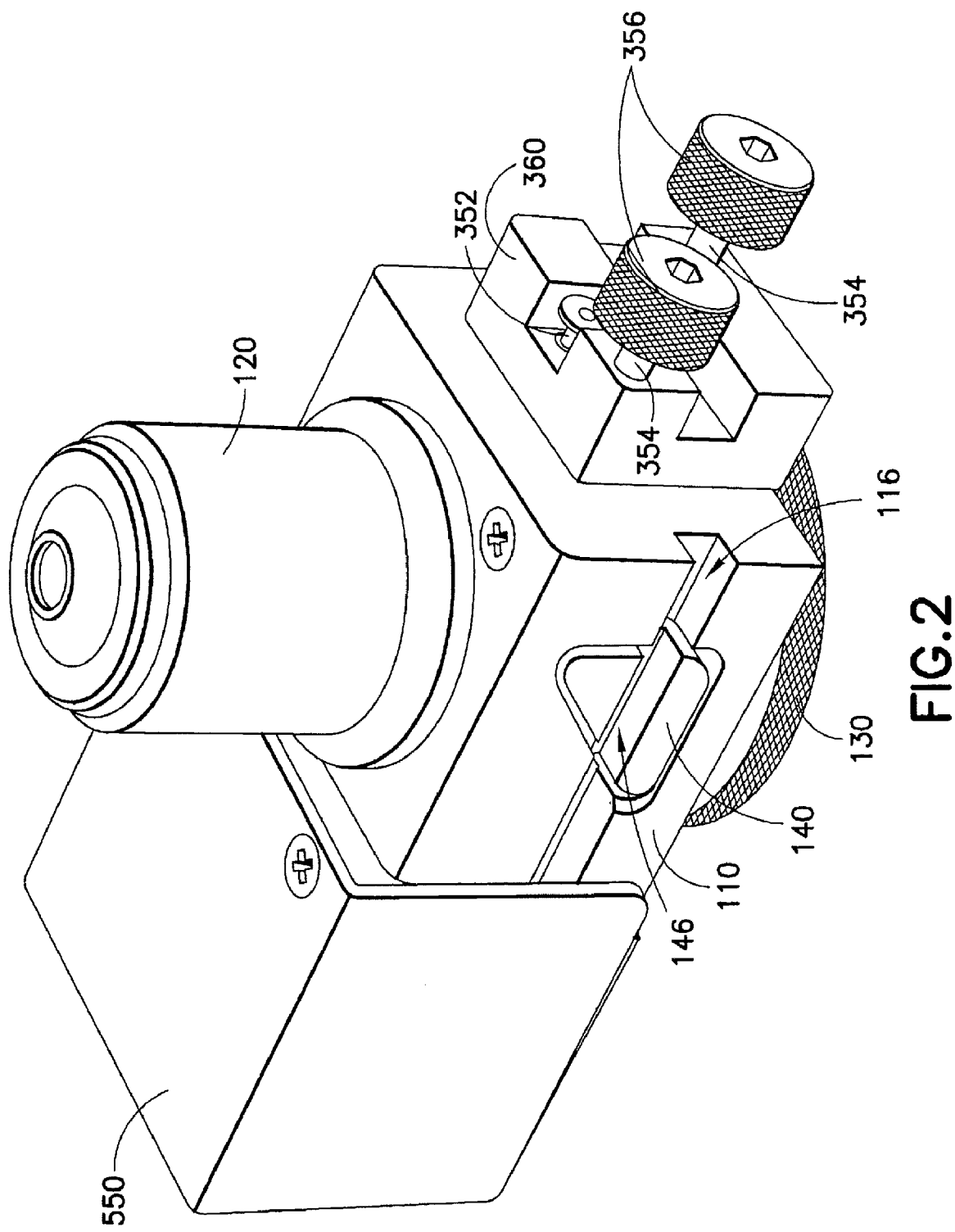
FIG. 2 is a perspective view of an objective assembly in accordance with an exemplary embodiment of the invention.

Preferably, external portion 364 includes one or more first bores 368 for receiving a screw 352 to attach indicator mount 360 to housing 110. Preferably, a spring 352a (See FIG. 3) or other urging mechanism is provided within or proximate first bores 368. Referring to FIGS. 2, 4 and 7B, external portion 364 can include partial cut-outs sized and shaped to receive the head of the screw 352 which connects indicator mount 360 to housing 110, with a spring so as to maintain constant pressure between indicator mount 360 and housing 110.

External portion 364 preferably also includes one or more second bores 369 for receiving an adjustment mechanism such as an adjuster screw 354. As shown in FIGS. 1-2, a knob 356 can be connected to adjuster screw 354 proximate the head of adjuster screw 354. The position of indicator light source 310 and indicator collimating lens 320, and thus indicator beam 322, can be adjusted by the adjustment mechanism, for example, manually by turning knob 356 accordingly. Preferably, small adjustments of the indicator beam 322 can result in changing the position of the focused spot on the image plane of the eyepiece. Preferably, one adjuster screw 354 can adjust the position along the X axis, and one adjuster screw 354 can adjust the position along the Y axis. The number of adjuster screws can be varied without deviating from the scope of the invention. Additionally, knobs and/or adjuster screws may not be necessary. Rather, alternate adjusting mechanisms for adjusting the direction of the indicator beam, the position of the focus point of the indicator beam whereat the indicator beam converges, can be provided as well.

Referring to FIGS. 4A and 7BA, an embodiment of external portion 364 of indicator mount 360 includes a groove 361 sized and shaped to partially receive a ball 361a between external portion 364 and housing 110, wherein ball 361 may be a balance point. As described above, springs 352a in screws 352 can apply a force on indicator mount 360 toward housing 110. Adjustment screws 354, in contrast, can move indicator mount 360 away from housing 110, thus opposing the force of springs 352a. It is to be understood that alternate arrangements, systems and methods of adjusting the direction of indicator beam 322 can be provided without deviating from the scope of the invention: for example, a round-end screw may be used instead of a ball 361a in order to allow the external portion 364 to press on the housing 110. Referring to FIGS. 1 and 9A-9D, indicator assembly 300 preferably includes an indicator cover 350.

In accordance with an embodiment of the invention, adjustment screws 354 can be provided without knobs 356, wherein a tool, such as a special tool designed for use with adjustment screws 354, can be used to turn or otherwise displace adjustment screws 354. Preferably, adjustment screws 354 are set and maintained in the set position and re-set only if they need readjustment.

In accordance with an embodiment of housing 110 shown in FIGS. 6A-J, housing 110 can include an objective receiving portion 112 via which objective 120 can be mounted onto housing 110. A laser receiving portion 113 can project perpendicularly from objective 120 and include a laser bore 113a. Collimating lens 520 of laser assembly 500 is preferably housed within laser bore 113a. Additionally, piston 540, and more preferably the proximal portion 542 of piston 540, can be displaced within laser bore 113a toward and away from objective receiving portion 112.

Referring to FIGS. 3-4A, the embodiment of piston 540 shown is partially received in housing 110. Piston 540 can include a proximal end 542 having laser source 510 housed therein, mounted thereon or otherwise connected to piston 540. Proximal end 542 is preferably received within housing 110 and preferably remains within housing 110, for example, to maintain the alignment between laser source 510 and collimating lens 520. Piston 540 can also include a distal end 544 extending outside housing 110, distal end 544 being displaceable toward and away from collimating lens 520.

Housing 110 can also include a slot 116 [see FIG. 2] extending along a side of housing 110 and a mirror bore 114. Mirror bore 114 is preferably sized and shaped to permit a mirror mount 140 to be inserted into housing 110 through mirror bore 114. Reference is made to FIGS. 8 A-G, wherein an embodiment of a mirror mount 140 is illustrated as having a mounting element 142 having an aperture 142a for receiving mirror 530 and exposing both sides of mirror 530. A first indicator aperture 144a and a second indicator aperture 144b can also be provided, preferably perpendicularly with each other and in fluid communication with aperture 142a. Therefore, indicator beam 322 can preferably travel along first indicator path 324 within first indicator aperture 144a toward mirror 530 and reflect off mirror 322 into second indicator path 334, without obstacles.

By providing an indicator assembly 300 which provides an indicator beam 322 emitted toward the eyepiece while maintaining substantial alignment with collimated laser beam 522, the viewer can see an indication of location of collimated laser beam 522 on the stage, and thus, on the sample. Therefore, the user can see where on the sample the laser would be focused prior to actually emitting the laser. A visible indication via the eyepiece, and thus at the microscope where the laser manipulation is being conducted, may facilitate laser manipulation as compared to viewing the position of the laser on a screen.

In accordance with an exemplary embodiment, collimated laser beam 522 travels through objective 120 until it converges into a laser focal point at a distance above objective 120. Preferably, the laser focal point is proximate the stage of the microscope, more preferably at a height above the stage at which laser manipulation, such as ablation, is desired. The height of the laser focal point is preferably controlled by adjusting the distance between laser source 510 and collimating lens 520. For example, laser source 510 can be connected to a piston 540 that is displaceable toward and away from collimating lens 520.

The horizontal position of the collimated laser beam 522, and more specifically the laser focal point, is preferably fixed and maintains coaxial with objective optical path 122. Rather, the sample being manipulated is preferably displaced until the collimated laser beam 522, more specifically the laser focal point, is at the desired location on the sample.

In accordance with an exemplary embodiment, laser assembly, objective, and indicator assembly are arranged and fixed once the desired alignment is achieved. Therefore, accuracy can be maintained even if the objective or objective assembly is removed from one microscope to another, etc. However, it can be desirable to calibrate the objective assembly regularly, for example, daily.

An exemplary embodiment of the invention relates to a method of providing a visible mark in the eyepiece field of a microscope, preferably indicating the position of a laser or other light source on the object. For example, in a system where a laser or other beam is introduced into the optical path by means of a mirror, an indicator assembly can be provided to emit an indicator beam onto the opposite side of the mirror. When the mirror is a 45° mirror, the indicator beam is preferably parallel to the laser or other beam being emitted toward the mirror. Accordingly, the reflected beams can also remain parallel to each other. Preferably, the beams are arranged such that the reflected beams are coaxial and travel in opposite directions, such that whereas the reflected laser or other beam is emitted toward the stage of the microscope, the reflected indicator beam can be emitted toward the eyepiece. Therefore, whereas the laser or other beam reaches the stage of the microscope and the sample thereon, the indicator beam can reach the eyepiece thus providing a visible representation of where the laser or other beam is being provided on the stage.

Examples of suitable systems with which an indicator beam can be provided, such as by providing an indicator assembly as described herein, include the ZILOS-tk and Xyclone laser systems provided by Hamilton Thorne, Inc., which have a laser fixed to an objective and mountable onto the turret of a microscope. In such systems, wherein a laser source, collimating lens and dichroic mirror positioned within the optical axis of an objective is already provided and aligned such that the laser beam reflecting off the dichroic mirror is coaxial and coincidental with the optical path/optical axis of the objective, the indicator assembly can be added without adding much bulk to the existing system. More specifically, because the same dichroic mirror can be used, the system can be modified relatively easily.

Alternatively, an indicator assembly can be added to a microscope using a laser beam introduced in an epifluorescent format. Furthermore, it is to be understood that indicator assembly can be provided without an objective, and can be provided at a different position within the microscope rather than being mounted on the turret. For example, the indicator assembly can be provided above or below the turret, preferably arranged so that the indicator beam is coaxial with the laser beam and the image beam.

A majority of microscopes currently sold are infinity-corrected, which means that the light passing from the objective to the tube lens of the eyepiece is collimated. The tube lens focuses the collimated beam on to the camera or eyepiece plane, where it forms an image. The indicator beam is also collimated and preferably is focused by the tube lens onto the same plane. Therefore, a tight spot, an image of the aperture between LED and collimating lens, can be provided on the image plane.

However, some microscopes are "160 mm corrected", wherein there is no tube lens and the light from the objective focuses directly on to the image plane, which is close to 160 mm from the objective. The indicator assembly can be provided in such microscopes as well. Preferably, the indicator collimating lens 320 is fixed further away from the aperture 342 than when used with a non 160-mm corrected microscope. Thus, a converging indicator beam can be produced, and the collimating lens position can be set such that the indicator beam converges to an image preferably at approximately 160 mm. In other words, the indicator beam preferably converges at the same distance as the image from the objective. A small, tight spot is preferably formed on the image plane. The indicator assembly can be used for both types of microscopes and is not limited to infinity-corrected microscopes.

In accordance with further embodiments of the present invention, the laser source includes an internal laser powered from an electronic package. The laser source can further originate using fiber optic cable providing optical energy from a laser. The laser can be one of an internal laser and an external laser, and operate at a wavelength ($\lambda$) of about 1480 nm. The laser beam can also be confocal with an optical image.

The microscope can take the form of an inverted or a non-inverted microscope. The microscope objective can take the form of a shortened optical train to provide a standard total length 45 mm parfocal objective unit module. The system can also be adapted to longer parfocality systems, e.g., the Nikon CFI 60 optics (60 mm parfocality system).

In accordance with another embodiment, the turret has a removable turret adapter. The turret adapter can be one of a plurality of turret adapter designs, thereby creating a universal mounting system, which enables the optical injection system to be mounted to the microscope.

The system of the present invention can be utilized in a number of different applications, including ablating, dissecting, enucleating, separating, moving, holding, or otherwise affecting biological cells or tissue with a laser source.

In further detail of the example application, the early-stage mammalian embryo is contained within a protective layer, the zona pellucida ("ZP"). The ZP is relatively analogous to the shell of a hen's egg. This proteinaceous ZP layer is of varying thickness, typically 10 to 20 µm, and of varying hardness. The embryo remains within the ZP during development from the single-cell to the blastocyst stage, at which point the embryo breaks out of the ZP and implants itself into the uterine wall.

It has been found that certain embryos, typically those from older mothers or embryos that have been frozen for storage, frequently have much tougher ZP layers than younger-origin or untreated embryos. Consequently, when the time comes for the embryo to emerge from the ZP, there may be a significant impediment in the tougher layers, which have to be traversed. If the embryo fails to hatch in the limited time available, it will be lost and fertility will fail.

Assisted hatching derives from the observation that fertility can be augmented by generating holes or gaps in the ZP through which the embryo can more easily emerge. This has been done using mechanical or ultrasonic cutting, chemical erosion (acidified Tyrodes solution), or by laser ablation of part of the ZP.

A laser can be used to produce a trench in the edge of the ZP layer, penetrating through (or almost through) the ZP thickness. The trench creates a weakened region through which the embryo will later emerge. Lasers of many types can ablate the ZP. A laser of wavelength $\lambda$=1480 nm, which is strongly absorbed in water, has been found to be effective for thermolysing the ZP. The laser can be used in pulses relatively short enough to avoid significant thermal conduction into the nearby embryo blastomeres, and at the same time avoid a chemical effect on the cellular chemistry, since it is in the non-actinic infrared wavelength region. The ZP is removed out to a radius around the laser beam determined by the local temperature history during the laser pulse.

The same laser system can be used to ablate a larger region of ZP so that an intact blastomere can be removed for external analysis. The laser is used, in this case, in a series of pulses directed at adjacent parts of the ZP to erode away a larger region. Typically, a gap is opened until a pipette can be introduced to suck out a blastomere. The embryo is relatively resilient, and generally survives both hatching and biopsy ZP ablation.

Another example of a related application of a laser system is in direct removal of the polar body for genetic analysis. Removal can be done either at the oocyte stage (first polar body), or after fertilization at the embryo stage (second polar body). Both polar bodies can be used to derive information on the genetic composition of the embryo. The procedure is analogous to laser assisted biopsy, except that in this case only the ZP layer and not the perivitelline membrane is penetrated) since the polar body remains between the perivitelline layer and the ZP. Additional related applications include transfer of part or all of the nucleus (nuclear transfer or transgenetic engineering), and ablation and destruction of part or all of the cell nucleus or oocyte spindle (e.g. in a cell to be used as the recipient of nuclear transfer). All of these applications benefit from the precise ablation capabilities of the laser system.

The above applications are by way of example and should not be construed as limiting the possible uses of the invention. The present invention can be applied in any field where a laser beam is used with a microscope assembly.

It is to be understood that an indicator assembly can be used concurrently with a screen display. For example, isothermal contours, otherwise referred to as, heat rings can be demonstrated on a display while permitting the user to rely purely on what is visible through the eyepiece when conducting the microsurgery or other study, manipulation, etc. of the sample.

In accordance with an embodiment of the invention, an electronic package can be disposed separate from the system.

Alternatively, the electronic package can be built-in to a board in a computing apparatus. In accordance with an embodiment of the invention, the laser source and/or the indicator light source may be located in the electronic package, and the laser energy transferred to the optical injection system through a fiber cable.

The laser can be mounted on a piston in a cylinder. Focus of the laser in such an arrangement can be provided by a single screw to adjust the distance from the laser to the collimating lens or via other mechanisms without deviating from the scope of the invention.

The method of the present invention can be utilized in conjunction with a number of different applications, including ablating, dissecting, enucleating, detaching, moving, holding, or otherwise affecting biological cells or tissue with a laser source. In light of shortcomings described above, it is desirable to provide a laser assembly for use with a microscope that includes a laser source and an objective, wherein the laser assembly may be placed on the turret of a microscope.

One of ordinary skill in the art will additionally appreciate different ways to alter the parameters of the embodiments disclosed, such as the size, shape, or type of elements or materials, in a manner still in keeping with the spirit and scope of the present invention.

Lasers have been utilized for manipulation of cells and cellular organelles. The application of a precise dose of radiation for a set time in a pre-designated area can be used to destroy or neutralize organelles, such as the nucleus, as well as cutting, trapping and heating entire cells. Whereas an example of using the lasers for drilling into embryo zona pellucida ("ZP") is described herein, this is merely an illustrative application and in no way is it intended that the present invention be limited to such application.

A benefit provided by an embodiment of objective assembly 100 is that a laser assembly and indicator assembly are packaged in a small integrated system which is small enough to be positioned very close to an objective and collectively mounted onto the turret. In one embodiment of the present invention, a specially designed low-profile objective (e.g. a short 21 mm objective) is provided to facilitate positioning of objective assembly 100 between the turret and the stage of the microscope.

Another benefit that can be provided by an embodiment of the invention is that a fluorescent filter-cube channel beneath the inverted microscope turret can be left unoccupied. The channel may thus be filled with other optical equipment.

It is to be understood that embodiments of the invention can be applied to substantially any embodiment of a laser to be used for microscope irradiation. Some examples include laser cutting, e.g., at a wavelength of $\lambda$=337-390 nm, laser scissors and laser tweezers, and laser differential heating. DNA denaturing (e.g. nucleus ablation) is another application. The system can be extended to any laser from which the power is delivered in a fiber-optic cable.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. An objective assembly for use with a microscope having an eyepiece and a stage, the objective assembly comprising:
    an objective having an optical axis that permits an image beam that is substantially aligned with the optical axis to be emitted through the stage and the objective toward into the eyepiece of the microscope to permit the stage to be seen through the eyepiece;
    a mirror positioned at an angle to the optical axis of the objective;
    a laser assembly positioned on a first side of the mirror for directing laser energy toward the mirror in a first laser path so that the laser energy is reflected off the mirror toward the objective and toward the stage in a second laser path that is substantially aligned with the optical axis; and
    an indicator assembly including an indicator light source positioned on the opposite side of the mirror for directing a beam of indicator light toward the mirror in a first indicator path so that the indicator light beam is reflected off the mirror away from the objective and toward the eyepiece in a second indicator path that is substantially aligned with the second laser path to permit visible indication at the eyepiece of the laser focal point,
    wherein the indicator assembly includes a collimating lens and a reducing member having an aperture, the reducing member being positioned between the collimating lens and the indicator light source.

2. An objective assembly as claimed in claim 1, wherein the objective assembly includes a turret adapter to permit the objective assembly to be releasably mounted to the turret of the microscope.

3. An objective assembly as claimed in claim 2, wherein the objective is about 21 mM.

4. An objective assembly as claimed in claim 1, wherein the mirror is a dichroic mirror, and wherein at least one side thereof has a reflection enhancing surface.

5. An objective assembly as claimed in claim 4, wherein the side of the mirror facing the laser assembly has a reflective coating.

6. An objective assembly as claimed in claim 5, wherein the beam of indicator light is transmitted through the mirror and reflected off the rear side of the reflective coating.

7. An objective assembly as claimed in claim 5, wherein the mirror includes a second reflective coating or an anti-reflective coating on the side of the mirror facing the indicator assembly.

8. An objective assembly as claimed in claim 1, wherein the indicator assembly includes a mechanical adjustment mechanism for adjusting the position of the light source and the collimating lens, so that the indicator spot produced at the eyepiece image plane may be moved in the image plane's x-y coordinates.

9. An objective assembly as claimed in claim 1, wherein the indicator assembly includes an adjustment mechanism that is constructed and adapted to permit the light source to be displaced along the first indicator path in order to change the distance between the light source and the collimating lens.

10. An objective assembly as claimed in claim 1, wherein the aperture has a diameter of about 5 to 10 µm.

11. An objective assembly as claimed in claim 1, wherein the aperture has a diameter of about 5 µm.

12. An objective assembly as claimed in claim 1, wherein the laser assembly includes a laser source, a collimating lens, and an adjustment mechanism that is constructed and adapted to permit the laser source to be displaced along the first laser path in order to change the adapted to permit the laser source to be displaced along the first laser path in order to change the distance between the laser source and the collimating lens and thus the height of the laser focal point.

13. An objective assembly as claimed in claim 12, wherein the laser source provides a laser beam having a wavelength of about 1480 nm.

14. An objective assembly as claimed in claim 12, wherein the laser source provides a laser beam having a wavelength of about 337 to 390 nm.

15. An objective assembly as claimed in claim 12, wherein the laser source includes a fiber optic cable delivering the laser energy.

16. An objective assembly as claimed in claim 1, wherein the mirror is positioned at a 45° angle to the optical axis and the first indicator path is parallel to the first laser path.

17. An objective assembly as claimed in claim 1, wherein the indicator light source is a light emitting diode.

18. An objective assembly as claimed in claim 1, wherein the laser assembly is constructed and adapted to provide the laser energy at the laser focal point for at least one of ablating, dissecting, enucleating, detaching, moving, holding, cutting, and heating a biological sample.

19. An objective assembly as claimed in claim 1, wherein the laser assembly, the objective, and the indicator assembly are fixed in position relative to one another once aligned.

20. An objective assembly as claimed in claim 1, wherein the indicator assembly is used concurrently with a screen display of isothermal contours.

* * * * *

UNITED STATES PATENT AND TRADEMARK OFFICE
CERTIFICATE OF CORRECTION

PATENT NO. : 8,149,504 B2  
APPLICATION NO. : 12/481363  
DATED : April 3, 2012  
INVENTOR(S) : Thomas G. Kenny et al.

Page 1 of 1

It is certified that error appears in the above-identified patent and that said Letters Patent is hereby corrected as shown below:

Title

Item (73) ASSIGNEE, "Hamilton Thorne Biosciences, Inc., Beverly, MA (US)"

should read:

--(73) ASSIGNEE, Hamilton Thorne, Inc., Beverly, MA (US)--.

Signed and Sealed this  
Eleventh Day of December, 2012

David J. Kappos  
*Director of the United States Patent and Trademark Office*